(12) United States Patent
Fanchin et al.

(10) Patent No.: US 10,890,409 B2
(45) Date of Patent: Jan. 12, 2021

(54) POWDER WEIGHT TRANSDUCER

(71) Applicant: Pioneer Archery Designs LLC, Spring Valley, CA (US)

(72) Inventors: Joe Fanchin, Spring Vally, CA (US); Zach Garrett, Spring Valley, CA (US)

(*) Notice: Subject to any disclaimer, the term of this patent is extended or adjusted under 35 U.S.C. 154(b) by 0 days.

(21) Appl. No.: 16/484,054

(22) PCT Filed: Feb. 6, 2018

(86) PCT No.: PCT/US2018/017070
§ 371 (c)(1),
(2) Date: Aug. 6, 2019

(87) PCT Pub. No.: WO2018/145092
PCT Pub. Date: Aug. 9, 2018

(65) Prior Publication Data
US 2019/0353449 A1 Nov. 21, 2019

Related U.S. Application Data

(60) Provisional application No. 62/455,577, filed on Feb. 6, 2017.

(51) Int. Cl.
| F41B 5/20 | (2006.01) |
| F16F 7/10 | (2006.01) |
| F16F 9/00 | (2006.01) |
| F16F 15/00 | (2006.01) |
| F41B 5/14 | (2006.01) |
| A63B 59/50 | (2015.01) |

(Continued)

(52) U.S. Cl.
CPC ............ *F41B 5/1426* (2013.01); *A63B 49/08* (2013.01); *A63B 53/14* (2013.01); *A63B 59/50* (2015.10); *A63B 60/54* (2015.10); *B25G 1/01* (2013.01); *F16F 7/10* (2013.01); *F16F 9/00* (2013.01); *F16F 15/00* (2013.01); *A63B 60/16* (2015.10)

(58) Field of Classification Search
CPC ... F41B 5/1426; F16F 7/10; F16F 9/00; F16F 15/00
See application file for complete search history.

(56) References Cited

U.S. PATENT DOCUMENTS 3,342,172 A * 9/1967 Sanders ............... F41B 5/1426
124/23.1
5,016,602 A * 5/1991 Mizek ................ F41B 5/1426
124/89

(Continued)

*Primary Examiner* — John A Ricci
(74) *Attorney, Agent, or Firm* — Lewis Kohn & Walker LLP

(57) ABSTRACT

A transducer attenuates a physiologically damaging vibration by converting vibration energy to fluidization energy. The transducer includes a canister defining a sealed enclosure, a powder contained within the enclosure, and a coupler for vibrationally coupling the canister to the physiologically damaging vibration. When undisturbed, the powder has a settled state occupying less than the entire enclosure of the canister. However, when excited by physiologically damaging vibration, the powder has a fluidized state occupying the entire enclosure of the canister. When agitated by the physiologically damaging vibration via the coupler, the canister transmits vibration energy to the powder contained therein and causes the powder to fluidize, thereby attenuating the physiologically damaging vibration.

6 Claims, 8 Drawing Sheets

(51) Int. Cl.
*A63B 60/54* (2015.01)
*A63B 49/08* (2015.01)
*A63B 53/14* (2015.01)
*B25G 1/01* (2006.01)
*A63B 60/16* (2015.01)

(56) References Cited

U.S. PATENT DOCUMENTS

| | | | | |
|---|---|---|---|---|
| 5,290,973 | A * | 3/1994 | Kwoh | F16F 9/006 |
| | | | | 181/199 |
| 5,735,257 | A * | 4/1998 | Walk | F41B 5/1426 |
| | | | | 124/89 |
| 6,494,196 | B2 * | 12/2002 | Harwath | F41B 5/1426 |
| | | | | 124/89 |
| 6,718,964 | B1 * | 4/2004 | Graf | F41B 5/1426 |
| | | | | 124/89 |
| 2012/0024645 | A1 * | 2/2012 | Tsugihashi | F16F 7/015 |
| | | | | 188/268 |

* cited by examiner

POWDER WEIGHT TRANSDUCER

FIELD OF INVENTION

The invention relates to vibration attenuation mechanisms employable with handheld devices susceptible to vibration, including both sports and industrial devices. More particularly, the invention relates to transducers that attenuate vibration by converting vibrational energy into fluidization energy within a frequency range known to cause physiological damage. The invention is directed to methods and mechanisms for enhancing the stability, performance, and safety of such handheld devices.

BACKGROUND

Vibration Induced Medical Disorders

Handheld devices that transmit vibrations to the user can cause significant physiological damage. For example, hand-arm vibration syndrome (HAVS) is an industrial injury triggered by the use of vibrating hand-held tools. The disorder affects the blood vessels, nerves, muscles, and joints, of the hand, wrist, forearm, elbow, and shoulder. The condition afflicts tens of thousands of sufferers. Physiological damage can occur at frequencies between 5 and 2000 Hz. The greatest risk for fingers is between 50 and 300 Hz. The greatest risk for hand and arm is between 8-16 Hz and a rapidly declining risk at higher frequencies. (International Organization for Standardization publication number ISO 5349-1, "Mechanical vibration—Measurement and evaluation of human exposure to hand-transmitted vibration.")

Handheld industrial tools that transmit vibration to the user fall into two broad categories, viz., 1. motorized handheld tools that vibrate more or less continuously during operation; 2. unmotorized handheld tools that generate intermittent vibration when employed. One type of tool in this latter category are tools that generate vibration by striking a work object. Exemplary unmotorized handheld tools of this latter category include claw hammers, sledge hammers, axes, etc. A striking tool can generate a discrete set of impulse vibrations each time the tool strikes its work object. The set of impulse vibrations is transmitted through the tool to the user's hand. From the user's hand, the vibrations can be further transmitted into the user's arm etc.

Handheld sport devices can also transmit vibrations to the user and cause vibration induced physiological damage. For example, archers are reported to suffer hand, forearm, elbow, and/or shoulder damage resulting from vibration transmitted from the bow to the archer after the arrow is released. (Rayan G M., South Med J., 1992, vol. 85(10), pp 961-4: "Archery-related injuries of the hand, forearm, and elbow"; Singh, A. K. et al., Saudi Journal of Sports Medicine, 2016, vol. 16 (3), pp 168-170: "Injuries in archers"; Mann D L, et al., Can J Sport Sci., 1989, vol. 14(2), pp 85-92: "Shoulder injuries in archery"; Shinohara H, et al., J Sports Med Phys Fitness, 2014, vol. 54(6), pp 772-9: "Does shoulder impingement syndrome affect the shoulder kinematics and associated muscle activity in archers?"; Palsbo S E., J Sports Med Phys Fitness, 2012, vol. 52(3), pp 293-9: "Epidemiology of recreational archery injuries: implications for archery ranges and injury prevention"; and Fukuda H, et al., Orthopedics, 1988, vol., 11(1), pp 171-4: "Archer's shoulder. Recurrent posterior subluxation and dislocation of the shoulder in two archers")

Vibration induced physiological damage has also been reported in other sports that employ a handheld device for striking some object. For example in baseball, golf, and tennis vibration induced physiological injury has been reported from the use of baseball bats, golf clubs, and tennis rackets.

Archery Stabilization

Conventional archery stabilization consists of devices that attach to a bow that increase the mass and moment of inertia of the bow. This increases the force required to translate or rotate the bow, thereby increasing its stability. Many of these devices are exceedingly rigid, and as a consequence the energy stored in the bow is felt as vibration to the archer. Vibration results in increased noise and shock to the archer's hand, and in general is an unpleasant and accuracy-reducing side effect.

Vibration Damping Mechanisms

A variety of strategies have been employed for minimizing the physiological damage caused by vibrating handheld devices. Most of these strategies employ a vibration damping mechanism. For example, in the industrial area, anti-vibration gloves are widely employed for damping vibration when using handheld devices that generate potentially damaging vibrations. Conventionally, the gloves incorporate a vibration damping material within the palm of the glove. However, in some instances, such anti-vibration gloves are criticized because, while they effectively damp vibrations having relatively high frequencies, they are less effective for damping vibrations having a frequency range between 8-16 Hz, i.e., the frequency range having the greatest potential for causing physiologically damage to the hands and arm. An alternative strategy is to incorporate a hand grip into the design the handheld device and to construct the hand grip using a vibration damping material. When using the device, the user's hand grips the vibration damping material of the hand grip. However, the same criticism applies to the hand grip as to the above anti-vibration gloves, viz., although effective for damping vibrations at relatively high frequencies, such hand grips are less effective for damping vibrations having a frequency range between 8-16 Hz, i.e., the frequency range having the greatest potential for causing physiologically damage to the hands and arm. In yet another approach, vibration damping material may be attached externally to the handheld device. U.S. Pat. No. 6,718,964 discloses an archery bow having a stabilizer with an elongated damping element for damping vibrations. In the sport of tennis, such Vibration dampers are sometimes known as "gummies." They are considered ineffective for preventing vibration induced injury. In yet another approach, vibration damping material may be incorporated into the interior of the device. U.S. Pat. No. 5,735,257 discloses an archery bow having a stabilizer with an elongate housing having a plurality of separate internal chambers containing damping material or damping devices.

What was needed was a vibration transduction device that could be incorporated into a handheld device for attenuating vibrations transmitted to the user so as to protect the user against vibration. What was needed was a vibration transduction device that could attenuate the specific vibrational frequencies that cause physiological damage.

SUMMARY

One aspect of the invention is directed to a transducer for converting vibration energy to fluidization energy. The transducer may be employed for attenuating a physiologically damaging vibration. The transducer comprises a canister defining a sealed enclosure, a powder contained within the enclosure, and a coupler for vibrationally coupling the canister to the physiologically damaging vibration. The powder, when undisturbed, has a settled state that occupies less than the entire enclosure of the canister. On the other hand, the powder, when excited by physiologically damaging vibration, has a fluidized state occupying the entire enclosure of said canister. The canister, when agitated by physiologically damaging vibration via the coupler, transmits vibration energy to the powder contained with canister so as to fluidize the powder. Consequently, the transducer is able to attenuate physiologically damaging vibration by converting vibration energy to fluidization energy.

Another aspect of the invention is directed to a handheld device employable by a user for performing a function, the performance of which generates a physiologically damaging vibration. The handheld device comprises a functional portion for performing the above function, a handgrip portion connected to the functional portion for use by the user for holding the handheld device, and a transducer vibrationally coupled to the handheld device. The transducer converts vibration energy to fluidization energy for attenuating the physiologically damaging vibration. Consequently, the transducer is able to attenuate physiologically damaging vibration from the hand held device by converting vibration energy to fluidization energy. In an alternative embodiment of this aspect of the invention, the function to be performed by the functional portion of the handheld device corresponds to functions of handheld devices selected from the group consisting of an archery bow, a golf club, a tennis racket, a baseball bat, a sport's stick, a fire weapon, a claw hammer, a sledge hammer, an ax, and a tool that generates a physiologically damaging vibration. In a further alternative embodiment of this aspect of the invention, the function to be performed by the functional portion of the handheld device corresponds to an archery bow of a type that includes a stabilizer having a distal end. In this embodiment, the transducer is vibrationally coupled to the archery bow by attachment to the distal end of the stabilizer.

Another aspect of the invention is directed to an improved archery bow having a handgrip and a stabilizer with a distal end. The improvement comprises a transducer attached to the distal end of the stabilizer for converting vibration energy to fluidization energy for attenuating the physiologically damaging vibration. The transducer also has sufficient weight for stabilizing the archery bow. Consequently, the transducer is able both to attenuate physiologically damaging vibration from the hand held device by converting vibration energy to fluidization energy and to stabilize the bow during use.

Another aspect of the invention is directed to a process for attenuating a physiologically damaging vibration from a handheld device. In the first step of the process, a transducer is vibrationally coupled to the handheld device. The transducer includes a canister defining a sealed enclosure, a powder contained within the enclosure of the canister, and a coupler for vibrationally coupling the canister to the physiologically damaging vibration. The powder, when undisturbed, has a settled state occupying less than the entire enclosure of said canister. On the other hand, the powder, when excited by physiologically damaging vibration, has a fluidized state occupying the entire enclosure of said canister. The canister, when agitated by physiologically damaging vibration via said coupler, transmits vibration energy to the powder contained therein for fluidizing the powder. Then, in the second step of the process, the handheld device is induced to generate the physiologically damaging vibration. And, then, in the third step of the process, the physiologically damaging vibration is transmitted from the handheld device to the transducer for converting vibration energy to fluidization energy therein. As a consequence, the transducer attenuates physiologically damaging vibration within the handheld device by converting vibration energy to fluidization energy.

DETAILED DESCRIPTION

In general terms, a transducer is a device that converts one form of energy to another. Disclosed herein is a transducer that converts vibrational energy to fluidization energy. The vibrational energy is associated with vibrational waves that propagate through a solid object as travelling deformations. A vibrational wave in a solid object may be started by an initial deformation which then propagates as a mechanical wave through the medium of the object as a result of restoring forces, typically associated with the elasticity of the object. The energy of vibration is approximately proportional to the energy of the deformations that initiate and/or drive the vibration, less any losses due to friction, heat, or other damping effects. Fluidization is a process whereby a powder is converted from a static solid-like state, i.e., a settled state, to a dynamic gas-like state. The process may be induced by vibrational excitation. The energy of fluidization is approximately proportional to the average kinetic energy of the fluidized powder particles. The transducer disclosed herein converts vibrational energy to fluidization energy.

Figure 6:
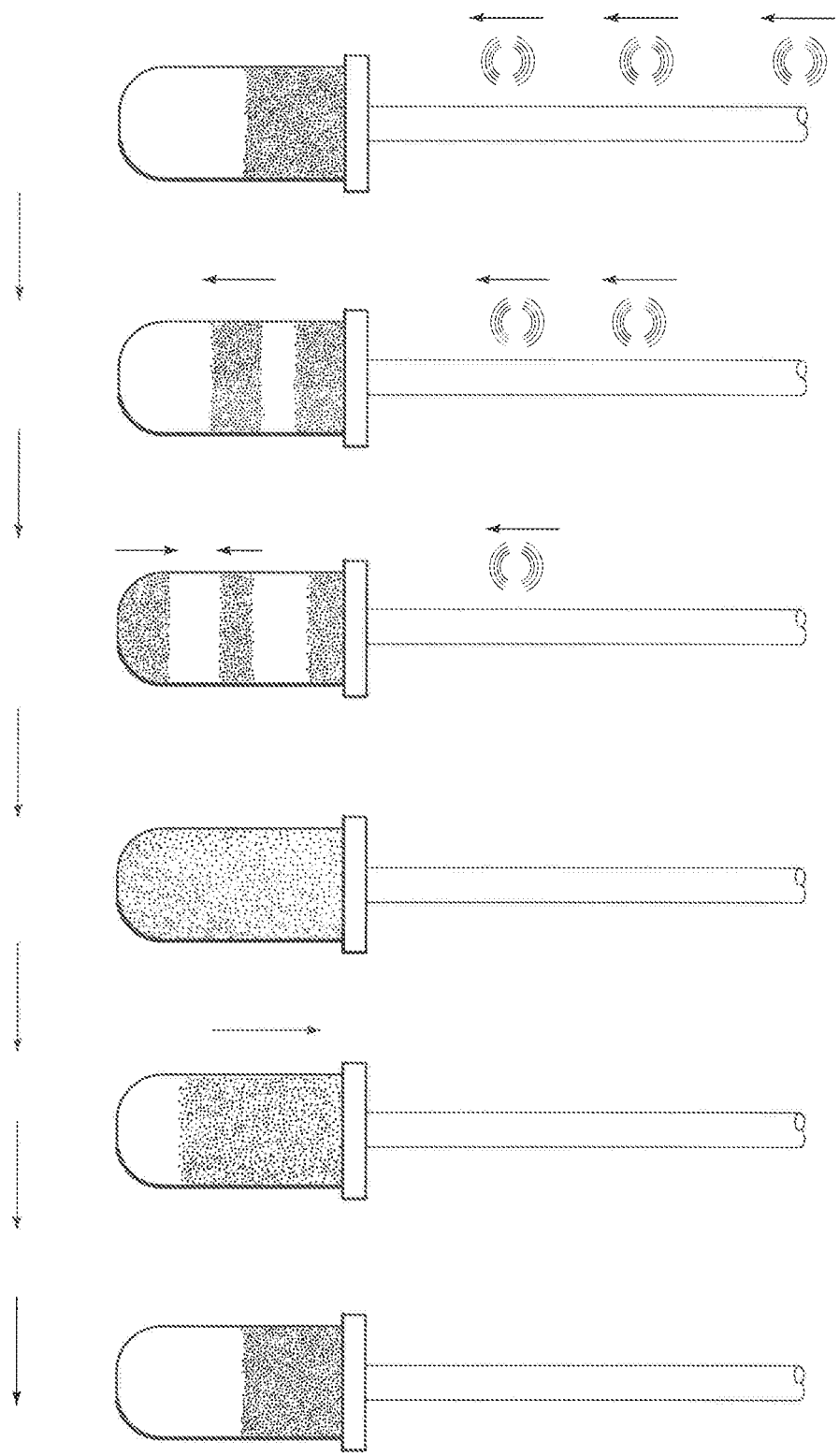
FIG. 6 is a schematic illustration of a transduction process whereby a transducer converts vibrational energy to fluidization energy. The process proceeds in six steps from left to right.

FIG. 6 schematically illustrates a transduction process for converting vibrational energy to fluidization energy within a powder weight type transducer. The process proceeds in six steps from left to right.

In the first step (FIG. 6, first object on the left hand side), vibrational waves are schematically illustrated travelling up a rod toward a canister containing a powder (viz., a powder weight type transducer). Powder in the transducer is illustrated in phantom and is shown to be its resting state.

In the second step (FIG. 6, object second from the left), the topmost vibrational wave is schematically illustrated as having departed the rod and entered the canister and the powder within the canister. The vibrational wave propagates upward through the powder therein as a shock wave. When the vibrational wave reaches the top of the powder, a first topmost layer of the powder is propelled upward to form a first ejection layer of powder, thereby converting the energy of the vibrational wave into kinetic energy.

In the third step (FIG. 6, object third from the left), a second vibrational wave is schematically illustrated as having departed the rod and entered the canister and the powder within the canister. This second vibrational wave then propagates upward through the powder therein as a shock wave. When the vibrational wave reaches the top of the settled powder, a second topmost layer of the powder is propelled upward to form a second ejection layer, thereby converting the energy of the second vibrational wave into kinetic energy. Meanwhile, first ejection layer of powder has recoiled against the top of the canister and reversed its direction and is moving at high speed toward the second ejection layer.

In the fourth step (FIG. 6, object fourth from the left), a third vibrational wave is schematically illustrated as having departed the rod and entered the canister and the powder within the canister. The energy of this third vibrational wave then converted into the kinetic energy of a third powder ejection layer within the canister. Meanwhile, first and second ejection layers have collided with one another and with the third ejection layer, to form a fully fluidized powder. The energy of fluidization is approximately proportional to the average kinetic energy of the fluidized powder particles.

In the fifth step (FIG. 6, object fifth from the left), the canister has ceased to be agitated by vibrational waves from the rod and the fluidized state of the powder is beginning to decay, due to dissipative forces, and to return to its settled state.

In the sixth step (FIG. 6, furthest object on the right), the energy of fluidization has fully dissipated and the powder has reverted to its settled state.

Figure 2A:
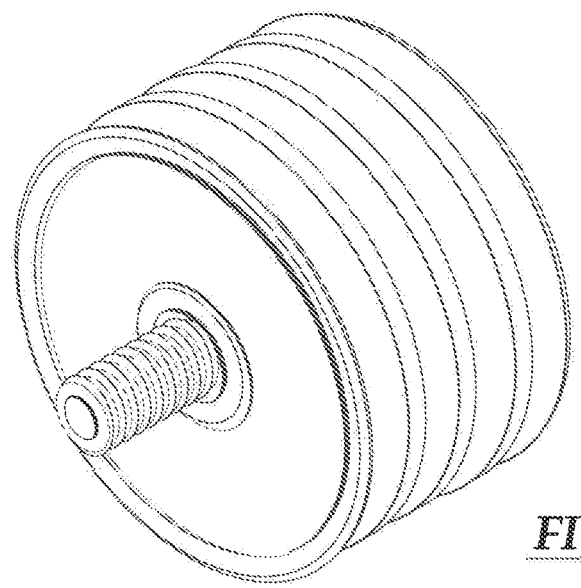
FIG. 2A is an enlarged perspective view of a transducer of a type illustrated in FIGS. 1A and 1B, with the transducer being detached from the distal end of the stabilizer.
Figure 2B:
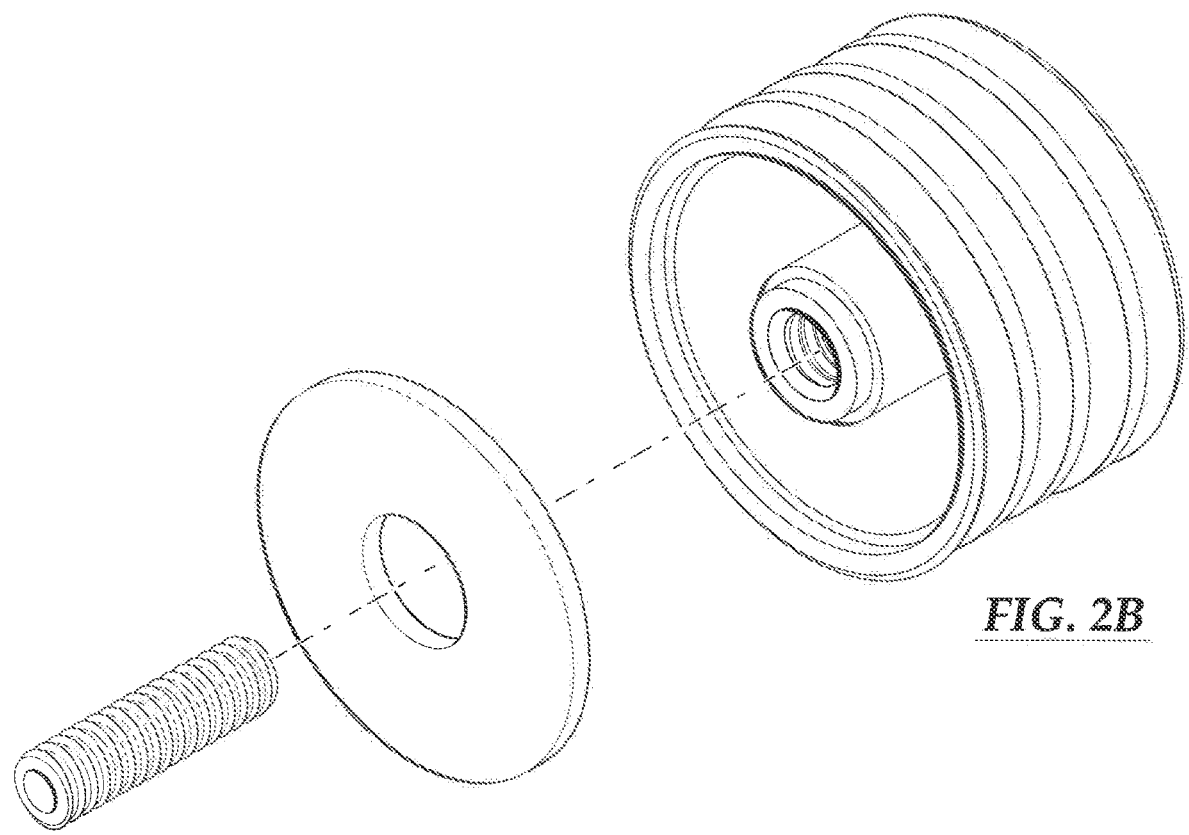
FIG. 2B is an exploded perspective view illustrating the transducer of FIG. 2A.
Figure 3:
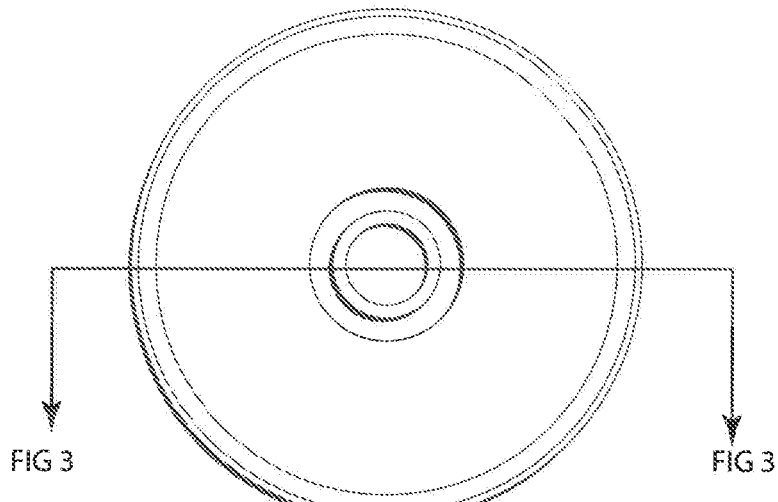
FIG. 3 is an orthogonal view of the transducer illustrated in FIG. 2A.
Figure 4:
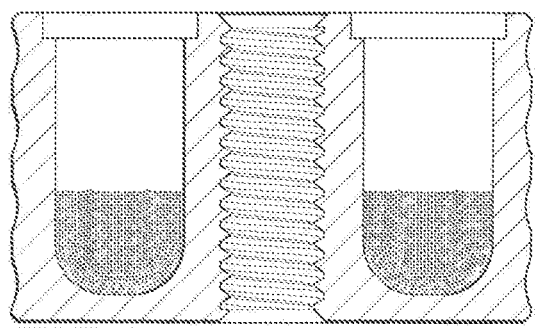
FIG. 4 is a sectional view of the transducer illustrated in FIG. 3.

A preferred embodiment of the transducer is illustrated in FIGS. 2-4. FIGS. 2A and 2B illustrate a powder weight type transducer. FIG. 2A illustrates an assembled transducer. FIG. 2B illustrates an exploded view of the transducer of FIG. 2A. The transducer includes a canister, a lid, and a coupler for coupling the transducer to a handheld device having vibrational waves in need of attenuation. FIG. 3 illustrates an orthogonal view of the transducer illustrated in FIG. 2A. FIG. 4 is a sectional view of the transducer illustrated in FIG. 3, illustrating the powder weight particles contained within the canister. The canister and lid be made of metal, plastic, or any sufficiently rigid and strong material to enable the protection and containment of powder. Powder can be made of any material that can be separated into many small pieces, but high-density materials, such as steel and tungsten, are particularly useful for increasing mass and vibration damping capabilities.

Figure 1A:
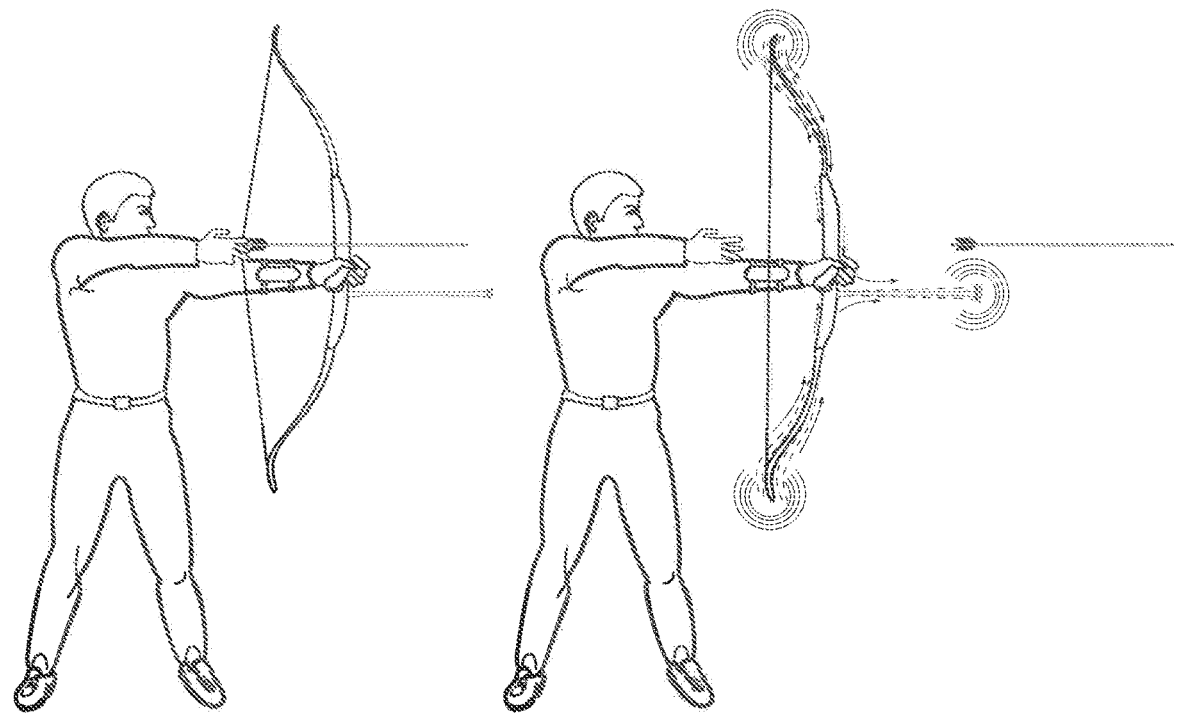
FIG. 1A is a perspective view illustrating a two step method for using a transducer for attenuating vibration arising in a bow after an archer releases an arrow therefrom. The first step of the method is illustrated on the left and the second step of the method is illustrated on the right. The transducer is attached to the distal end of a stabilizer extending from the bow.
Figure 1B:
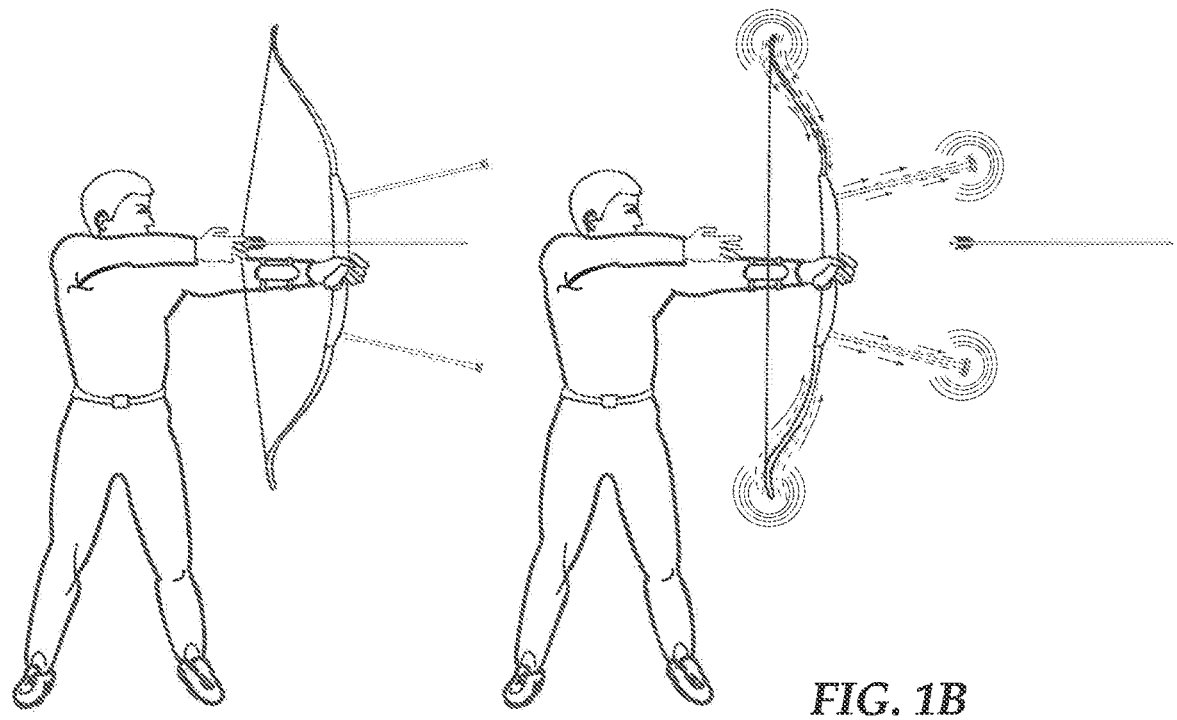
FIG. 1B is a perspective view similar to FIG. 1A illustrating a two step method for using two transducers for attenuating vibration arising in a bow after an archer releases an arrow therefrom. The first step of the method is illustrated on the left and the second step of the method is illustrated on the right. The two transducers are each attached, respectively, to the distal ends of two stabilizers, each stabilizer extending from the bow.

FIGS. 1A and 1B illustrate a preferred use of the transducer, viz., the attenuation of vibrational wave in an archery bow. FIGS. 1A and 1B illustrate the deformation of the bow, prior to releasing an arrow, and the subsequent release of an arrow followed by the resonance of the bow.

More particularly, FIGS. 1A and 1B illustrate a two step method for using a transducer for attenuating vibration arising in a bow after an archer releases an arrow therefrom. The first step of the method is illustrated on the left and the second step of the method is illustrated on the right. The transducer is attached to the distal end of a stabilizer extending from the bow.

Figure 5:
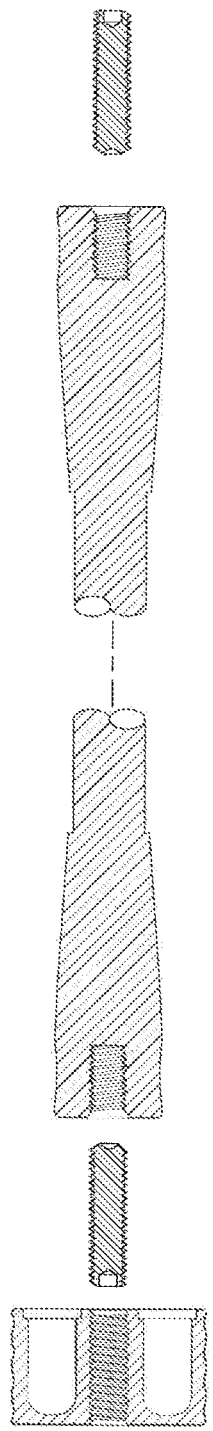
FIG. 5 is an exploded sectional view of a transducer and stabilizer. The transducer is a diminished view of the transducer illustrated in FIG. 4. The stabilizer is an enlarged sectional view of the stabilizers illustrated in FIGS. 1A and 1B.
Figure 7A:
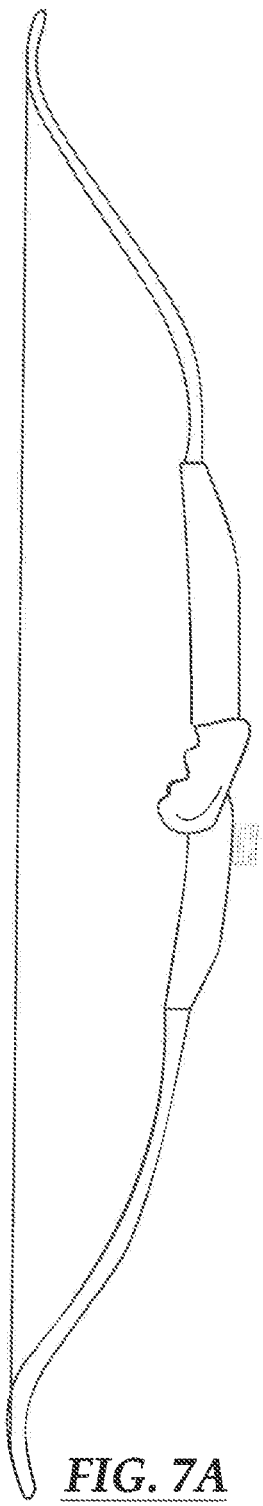
FIGS. 7A-C are perspective views of a bow having one or more transducers attached directly thereto.
Figure 7B:
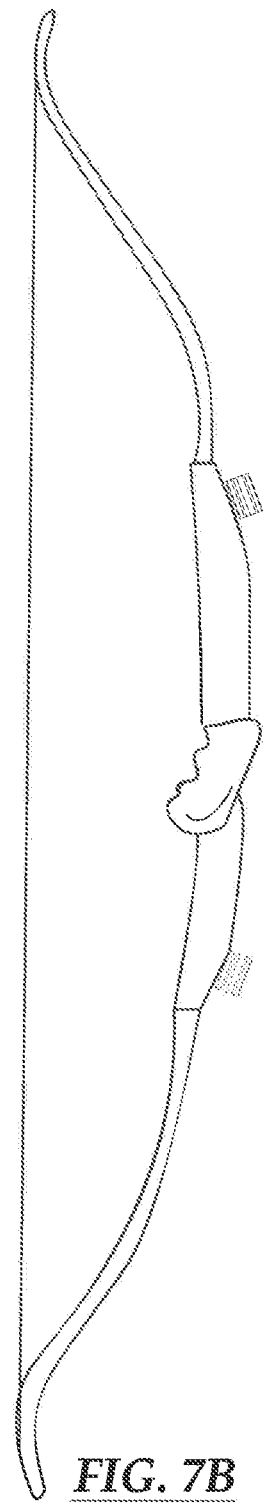
Figure 7C:
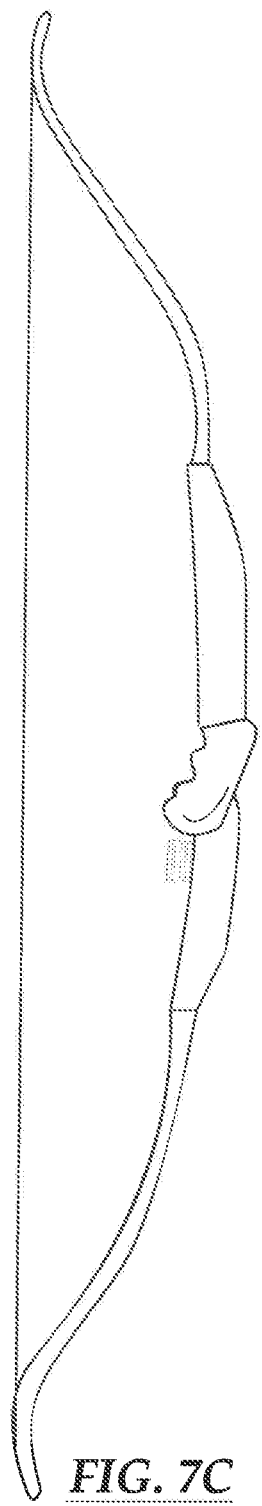

FIG. 1B is a procedure similar to the procedure illustrated in FIG. 1A, except in FIG. 1B two transducers are employed for attenuating vibration. The two transducers are each attached, respectively, to the distal ends of two stabilizers, each stabilizer extending from the bow. An enlarged sectional view of the transducer and stabilizer is illustrated in FIG. 5. The transducer of FIG. 5 corresponds to the transducer illustrated in FIGS. 2-4, with a diminished scale. The stabilizer is an enlarged sectional view of the stabilizers illustrated in FIGS. 1A and 1B. In an alternative embodiment, archery transducers need not be located at the distal end of a stabilizer. Alternative placements for the transducers are illustrated in FIGS. 7A-C, where they are attached directly to the riser.

Figure 8:
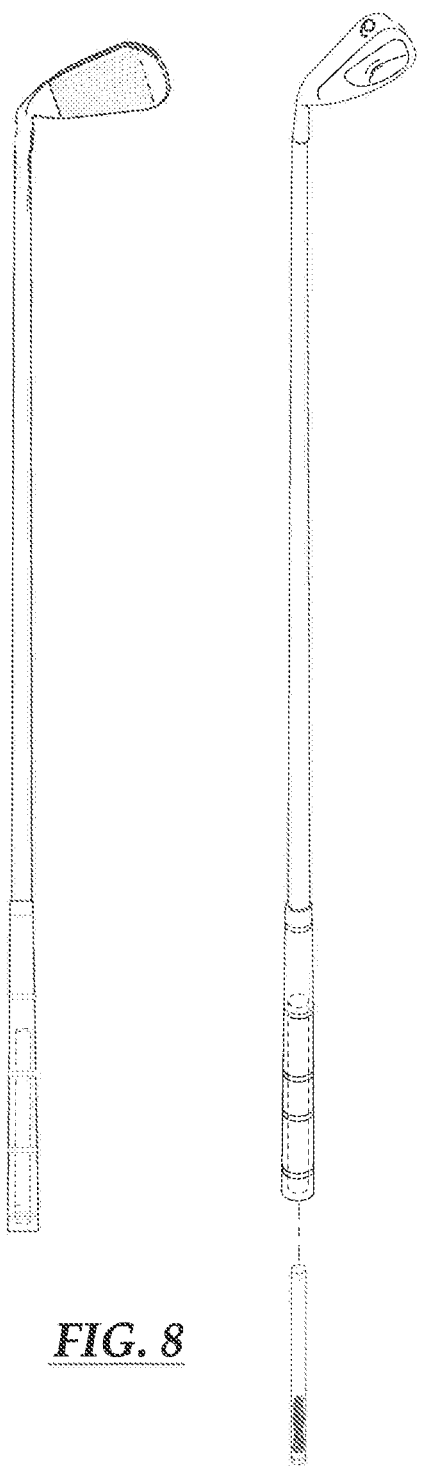
FIG. 8 is a perspective view illustrating both an assembled golf club and an exploded perspective view of the assembled golf club. The golf club defines a cavity in its handle for containing a transducer for attenuating vibration.
Figure 9A:
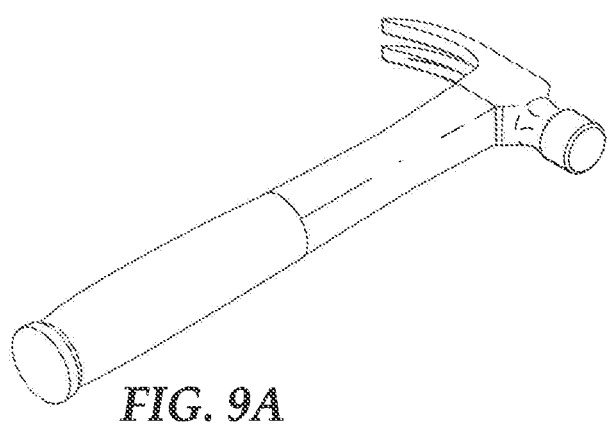
FIG. 9A is a perspective view illustrating a claw hammer.
Figure 9B:
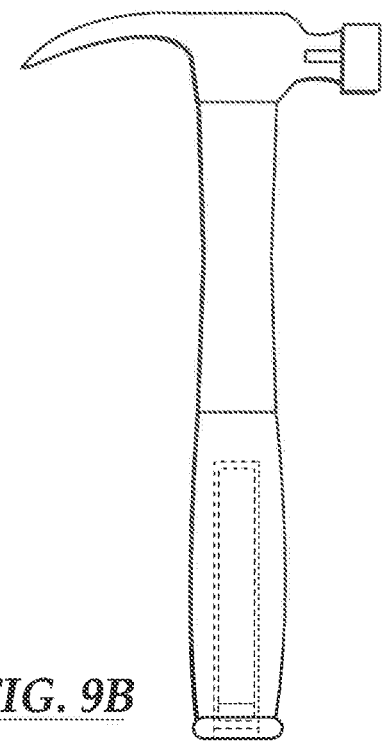
FIG. 9B is an orthogonal view of the claw hammer of FIG. 9A illustrating phantom views of a cavity within the handle of the claw hammer and a transducer contained within the cavity for attenuating vibration.
Figure 10A:
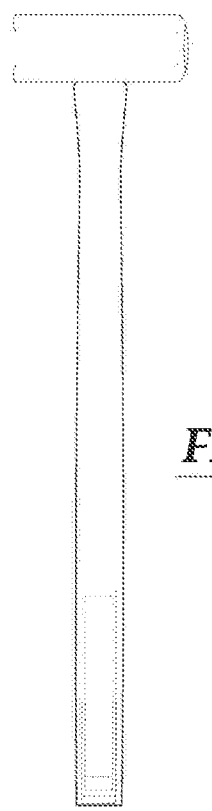
FIG. 10A is a perspective view illustrating a sledge hammer.
Figure 10B:
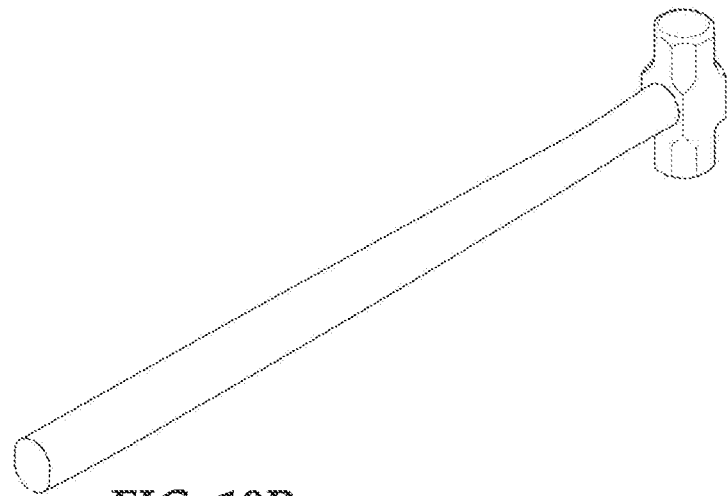
FIG. 10B is an orthogonal view of the sledge hammer of FIG. 9A illustrating phantom views of a cavity within the handle of the sledge hammer and a transducer contained within the cavity for attenuating vibration.

The transducer may be employed with a number of handheld sport devices and handheld work devices. For example, FIG. 8 illustrates golf club having a cavity in its handle for containing a transducer for attenuating vibration. FIGS. 9A and B illustrate a claw hammer having a cavity in its handle for containing a transducer for attenuating vibration. FIGS. 10A and B illustrate a sledge hammer having a cavity in its handle for containing a transducer for attenuating vibration.

EXAMPLE

A bow is a device for shooting arrows. The bow is a flexible arc, the ends of which are joined by a string, under tension. When the string is drawn back, the ends of the bow are flexed. When the string is released, the potential energy of the flexed stick is converted into kinetic energy. Most of the kinetic energy is transferred to the arrow. However, some of the kinetic energy remains with the bow. The bow, together with the bow string, then act as a harmonic oscillator, oscillating about an equilibrium position. Unfortunately for the archer, the archer's hand and arm can act as a damping agent for absorbing the energy of the oscillations. This can fatigue and/or damage the joints of the archer's hand and elbow.

As illustrate in FIGS. 1A and 1B, one or more stabilizers, each having a transducer attached to its distal end, may be attached to the riser of the bow and employed for attenuating the oscillations of the bow. Use of the combination stabilizer/transducer protects the archer from injuries resulting from absorbing the energy of the oscillating bow. When the bow oscillates after shooting an arrow, the oscillations of the bow are coupled to the transducer via the stabilizer. In effect, the bow and the transducer become coupled oscillators. The oscillations of the system are quickly attenuated by the transducer.

The transducer also serves as a weight for stabilizing the bow when the transducer is attached to the distal end of a stabilizer. It is disclosed herein that the transducer combines the functions of a vibration attenuator and a stabilizing weight into a single unit, viz., a "powder weight." The powder weight employs high density particulate matter enclosed within an enclosure, together with sufficient void space so as to enable the particulate matter to transition between a non-fluidized state and a fluidized state. The high density particulate matter has sufficient mass to serve as the weight. In its resting state, the particulate matter is non-fluidized. However, when the particles are agitated by forced vibrations, they become fluidized. The transition from the non-fluidized state to the fluidized state absorbs energy and serves to attenuate the vibrations.

The powder weight may be attached to the distal end of a stabilizer connected to a bow, or, alternatively, may be attached directly to the bow.

The canister should be sufficiently large to contain the powder, such as about one-half to six inches in diameter (or width) and one-quarter to about eight inches in length. The canister is also shaped in such a way as it can be attached to the bow either directly or indirectly, such as by a screw or fastener. The lid is attached to canister in such a way as to prevent powder from escaping the canister. Powder should have sufficient fineness for fluidization, provided that there are enough granules to sufficiently redistribute and attenuate vibration.

In more detail, the transducer, having the combined mass of the canister, lid, and powder contained therein, is attached to the bow and increases the mass and moment of inertia of the bow. The increase in mass and moment of inertia serves to reduce motion and stabilize the bow while it is being used, thus increasing its accuracy. The characteristics of the powder also enhance the attenuation of the vibrations. This vibration attenuation increases the comfort experienced by the user and further increases the accuracy of the bow.

Advantages of the present invention include, without limitation, that it provides sufficient mass for stabilization while also using the mass of powder to absorb energy and vibration. Typical weights are often made of a solid metal, and thus can provide mass but are exceedingly rigid and offer only minimal vibration damping. Typical vibration damping products are also made of much lower density materials, and thus provide only minimal mass for stabilization. High-density variations of both the canister and powder also offer an advantage of reduced cross-sectional area that can be affected by wind, thus increasing accuracy in windy conditions.

Specifications for an Exemplary Transducer

Mass—14 grams to 900 g (0.5 oz to 32 oz)
Length—1.25 cm to 20 cm (0.5" to 8")
Width—1.25 cm to 20 cm (0.5" to 8")
Height—1.25 cm to 20 cm (0.5" to 8")
Powder Density:
    Bulk density of material (solid before powderized)
        above 6 g/cc
    Tapped density of powderized material (settled powder density)
        above 3 g/cc
    Density of total product (including all enclosed space where damping material can flow)
        above 3 g/cc A preferred total combined density is approximately 7.5 g/cc.

Preferred powder compositions include tungsten and any iron or copper based alloy. However, other compositions having the required density may be employed.

The upper range of the preferred particle size is 0.635 mm (0.025" or approximately 28 mesh).

The preferred particle sizes include 325 mesh particles, rated as max size of 44 microns and 100 mesh rated as max size of 150 microns.

Test Data for Different Transducers

Tests were designed and conducted to illustrate the damping capability of a fixed volume weight with internal tungsten powder versus solid weight (baseline) and different powder materials of low (sand powder) and medium (steel powder) density.

The tests were conducted using a high performance Olympic Recurve style bow, having a total bow length of 64 inches, with a 23 inch riser and short limbs. The bow was a top of product line product from the year 2009. The only accessories employed were an arrow rest, plunger, bowstring, single front stabilizer, and single test weight on the end of the stabilizer. The stabilizer had a length of 20 inches and natural frequency greater than 80 hz. The arrow was a 1914 grade aluminum arrow, having a length of 27.5 inches and a mass greater than 300 grains, approximately 0.7 ounce. The arrow was drawn to 26" draw length before release. The bowstring was released using a mechanical release. An accelerometer was employed to measure the frequency response of the bow after the arrow was shot. Accelerometer was placed on the distal end of the test weight. 3000 samples per second were recorded. Samples were recorded for duration of 1 second after release of bowstring. The acceleration was measured in G's, i.e., 32.2 ft/sec^2 or 9.81 m/sec^2. After the arrow was shot, the bow and stabilizer were held loose with a finger sling and allowed to vibrate freely.

Four different weights were tested, viz., one solid steel weight and three steel cases containing different powder materials. All test weight had the same volume. The test weights containing powder materials were filled with powder to 80% of fill volume. The four test weights were as follows:

1. Solid Steel Weight having a total mass 4.0 ounce.
2. Steel Case weighing 2.2 ounce and containing a sand powder having a grain size finer than 200 mesh; the total overall mass of the Weight being 2.5 ounces.
3. Steel Case weighing 2.2 ounces and containing a steel powder having a grain size finer than 200 mesh; the total overall mass of the Weight being 3.0 ounces.
4. Steel Case weighting 2.2 ounces and containing a tungsten powder having a grain size finer than 200 mesh; the total overall mass of the Weight being 4.0 ounces.

Figure 11:
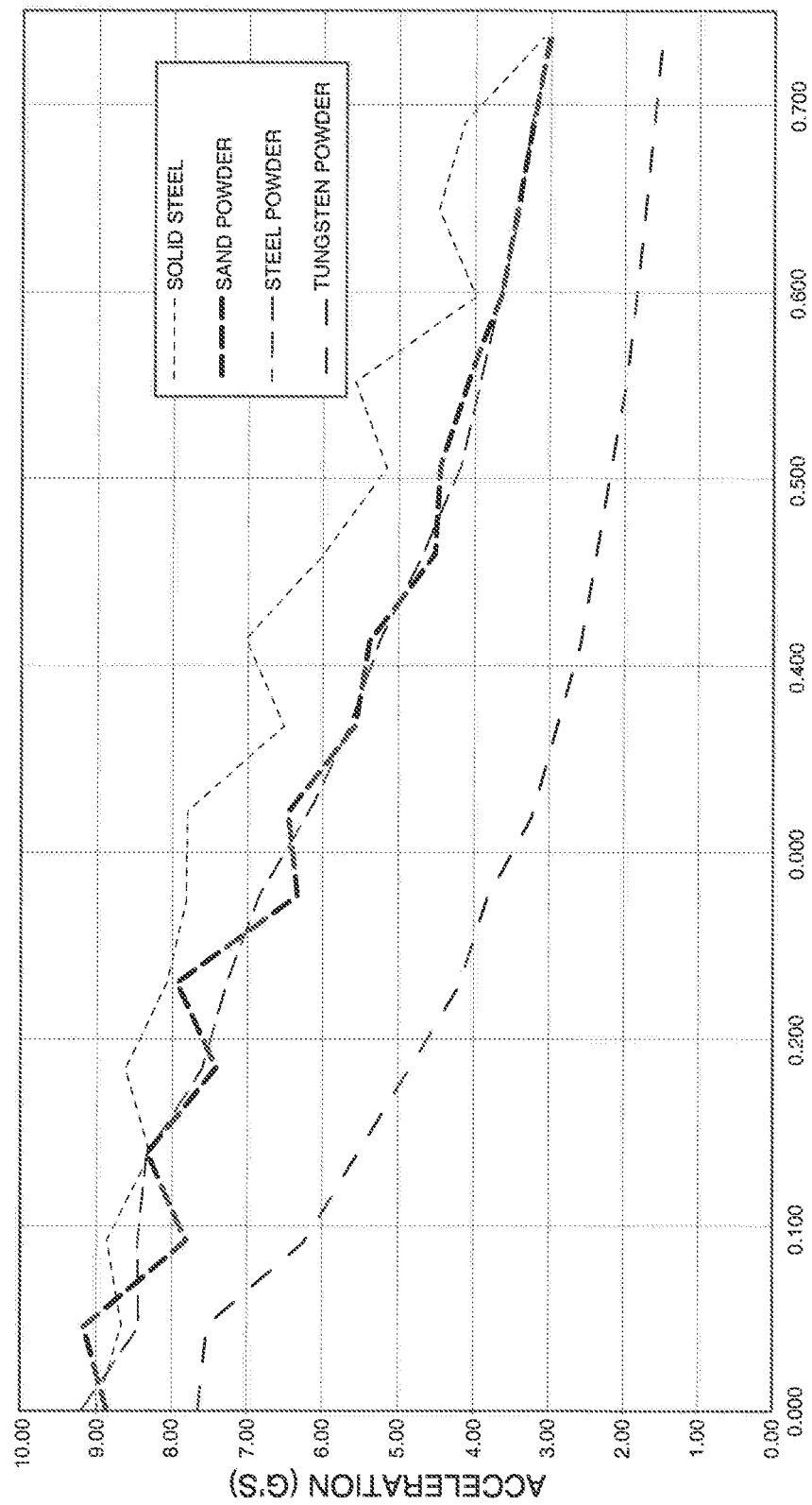
FIG. 11 is a chart illustrating test data for the damping capability of a fixed volume weight with internal tungsten powder versus solid weight (baseline) and different powder materials of low (sand powder) and medium (steel powder) density.

Five test runs were conducted on each configuration. The largest peak-to-peak responses were observed starting at 0.216 seconds after bow release. Damping of vibration was measured and graphed from that point forward. The results of the measurements are illustrated in FIG. 11.

Definitions

Powder: A material composed of very fine particles that are not cemented together.

Fluidization: A process whereby a powder is converted from a static solid-like state, i.e., a settled state, to a dynamic gas-like state. The process may be induced by vibrational excitation.

Fluidization Energy: The energy of fluidization is approximately proportional to the average kinetic energy of the fluidized powder particles.

Vibration: A vibration in a solid object started by an initial deformation which then propagates as a mechanical wave through the medium of the object as a result of restoring forces, typically associated with the elasticity of the object.

Vibrational Energy: The energy of vibration is approximately proportional to the energy of the deformations that initiate and/or drive the vibration, less any losses due to friction, heat, or other damping effects.

Physiologically damaging vibration: Repeated exposure to vibration can cause physiological damage to blood vessels, nerves, muscles, tendons, and joints of the hand, wrist, arm, and shoulder. However, such damage is frequency specific and occurs only within specific frequency ranges. If one wishes to include all possible types of physiological damage, then a physiologically damaging vibration can include any frequency between 5 and 2000 Hz. However, the greatest risk for fingers is between 50 and 300 Hz; and the greatest risk for hand, arm, and shoulder is between 8-16 Hz.

What is claimed is:

1. A transducer for converting vibration energy to fluidization energy for attenuating a physiologically damaging vibration, the transducer comprising:
    a canister defining a sealed enclosure;
    a powder contained within the enclosure, said powder having a tungsten composition; and
    a coupler for vibrationally coupling said canister to the physiologically damaging vibration;
        said powder, when undisturbed, having a settled state occupying less than the entire enclosure of said canister, and said powder, when excited by physiologically damaging vibration, having a fluidized state occupying the entire enclosure of said canister;
        said canister, when agitated by physiologically damaging vibration via said coupler, transmitting vibration energy to said powder contained therein for fluidizing said powder;
    whereby the transducer attenuates physiologically damaging vibration by converting vibration energy to fluidization energy.

2. A handheld device employable by a user for performing a function, the performance of which generates a physiologically damaging vibration, the handheld device comprising:
    a functional portion for performing the function;
    a handgrip portion connected to said functional portion for use by the user for holding the handheld device; and
    a transducer vibrationally coupled to the handheld device for converting vibration energy to fluidization energy for attenuating the physiologically damaging vibration, said transducer including a tungsten powder;
    whereby said transducer attenuating physiologically damaging vibration from the handheld device by converting vibration energy to fluidization energy.

3. The handheld device as described in claim 2, wherein the function to be performed by said functional portion corresponding to the functions of handheld devices selected from the group consisting of an archery bow, a golf club, a tennis racket, a baseball bat, a sport's stick, a fire weapon, a claw hammer, a sledge hammer, an ax, and a tool that generates a physiologically damaging vibration.

4. A handheld device as described in claim 3, wherein the function to be performed by said functional portion corresponds to the function of an archery bow of a type that includes a stabilizer having a distal end, said transducer being vibrationally coupled to the archery bow by attachment to the distal end of the stabilizer.

5. In an improved archery bow having a handgrip and a stabilizer with a distal end, the improvement comprising:
    a transducer attached to the distal end of the stabilizer for converting vibration energy to fluidization energy for attenuating the physiologically damaging vibration;
    said transducer having a sufficient weight for stabilizing the archery bow said transducer including a tungsten powder;
    whereby said transducer serving both to attenuate physiologically damaging vibration from the archery bow by converting vibration energy to fluidization energy and to stabilize the bow during use.

6. A process for attenuating a physiologically damaging vibration from a handheld device, the process comprising:
    Step A: vibrationally coupling a transducer to the handheld device, the transducer including a canister defining a sealed enclosure, a powder contained within the enclosure of the canister, said powder having a tungsten composition; and a coupler for vibrationally coupling the canister to the physiologically damaging vibration;
        said powder, when undisturbed, having a settled state occupying less than the entire enclosure of said canister, and said powder, when excited by physiologically damaging vibration, having a fluidized state occupying the entire enclosure of said canister;
        said canister, when agitated by physiologically damaging vibration via said coupler, transmitting vibration energy to said powder contained therein for fluidizing said powder; and then
    Step B: inducing the handheld device to generate the physiologically damaging vibration; and then
    Step C: transmitting the physiologically damaging vibration from the handheld device to the transducer for converting vibration energy to fluidization energy therein;
    whereby the transducer attenuating physiologically damaging vibration within the handheld device by converting vibration energy to fluidization energy.

* * * * *